US012589346B2

(12) United States Patent
Sekigawa et al.

(10) Patent No.: US 12,589,346 B2
(45) Date of Patent: Mar. 31, 2026

(54) PAINT APPARATUS AND FILTER MODULE

(71) Applicant: Taikisha Ltd., Tokyo (JP)

(72) Inventors: Takuya Sekigawa, Tokyo (JP);
Tomotaka Miwa, Tokyo (JP)

(73) Assignee: Taikisha Ltd., Tokyo (JP)

( * ) Notice: Subject to any disclaimer, the term of this
patent is extended or adjusted under 35
U.S.C. 154(b) by 456 days.

(21) Appl. No.: 18/235,009

(22) Filed: Aug. 17, 2023

(65) Prior Publication Data

US 2024/0058735 A1     Feb. 22, 2024

(30) Foreign Application Priority Data

Aug. 19, 2022     (JP) ................................. 2022-131241
Jul. 10, 2023     (JP) ................................. 2023-113133

(51) Int. Cl.
| | |
|---|---|
| *B01D 46/42* | (2006.01) |
| *B01D 46/00* | (2022.01) |
| *B01D 46/02* | (2006.01) |
| *B01D 46/58* | (2022.01) |
| *B01D 46/62* | (2022.01) |
| *B05B 16/00* | (2018.01) |

(52) U.S. Cl.
CPC ..... *B01D 46/4227* (2013.01); *B01D 46/0013*
(2013.01); *B01D 46/02* (2013.01); *B01D*
*46/58* (2022.01); *B01D 46/62* (2022.01); *B05B*
*16/90* (2018.02); *B01D 2267/40* (2013.01);
*B01D 2271/022* (2013.01)

(58) Field of Classification Search
None
See application file for complete search history.

(56) References Cited

U.S. PATENT DOCUMENTS

| | | | | | |
|---|---|---|---|---|---|
| 4,590,884 | A | * | 5/1986 | Kreeger ................. | B05B 14/43 |
| | | | | | 118/631 |
| 2007/0092657 | A1 | * | 4/2007 | Ferguson ............... | B05B 16/60 |
| | | | | | 427/372.2 |
| 2014/0202332 | A1 | * | 7/2014 | Link ...................... | B05B 14/43 |
| | | | | | 55/436 |
| 2016/0288036 | A1 | | 10/2016 | Wieland et al. | |
| 2018/0207669 | A1 | * | 7/2018 | Zebisch ................. | B05B 16/40 |
| 2018/0345307 | A1 | * | 12/2018 | Schulze ................ | G05B 15/02 |

FOREIGN PATENT DOCUMENTS

| | | | |
|---|---|---|---|
| JP | 6773388 | B1 | 10/2020 |
| KR | 101889483 | B1 | 8/2018 |

* cited by examiner

*Primary Examiner* — Brit E. Anbacht
(74) *Attorney, Agent, or Firm* — The Webb Law Firm

(57)     ABSTRACT

The paint apparatus includes a paint booth having an upper
chamber in which a painting operation is performed and a
lower chamber placed below the upper chamber; a receiving
portion 2 that receives air discharged from the paint booth;
a filter module 3 attachable to and detachable from the
receiving portion 2 and including filter portions 31 and 32
that trap paint mist from air that passed through the receiving
portion 2, a filter inlet portion 33 that receives an inflow of
air from the receiving portion 2, and a filter outlet portion 34
that discharges air from which the paint mist was trapped by
the filter portions 31 and 32; and rails 6 that guide the filter
module 3 to an attached position at which the filter module
3 is attached to the receiving portion 2.

20 Claims, 8 Drawing Sheets

PAINT APPARATUS AND FILTER MODULE

CROSS-REFERENCE TO RELATED APPLICATION

This application claims priority to Japanese Patent Application Nos. 2022-131241 filed Aug. 19, 2022 and 2023-113133 filed Jul. 10, 2023, the disclosures of which are hereby incorporated by reference in their entireties.

BACKGROUND OF THE INVENTION

Field of the Invention

The present invention relates to a paint apparatus having a filter unit for connection to one side of a lower chamber of a paint booth, also relates to a filter module for attachment to the paint apparatus.

Description of Related Art

In a paint booth in which a painting target such as a vehicle body is to be painted, exhaust air containing paint mist that has not adhered to the painting target is generated. The paint booth is therefore provided with a filter for trapping the paint mist contained in the exhaust air.

Disposable filter elements made of a relatively inexpensive material such as cardboard are commonly used. Apparatuses for mounting a disposable filter under the floor of a paint booth are disclosed in US 2016/0288036 (Patent Document 1) and US 2014/0202332 (Patent Document 2). Since exhaust air containing paint mist is heavier than regular air, it is effective to utilize gravity to guide the paint mist to a position under the floor and trap the paint mist under the floor.

In the inventions of Patent Documents 1 and 2, an inlet through which air flows into the filter unit, and an outlet through which air flows out of the filter unit, are provided in the same surface of the filter unit. Therefore, it is sufficient to connect passage members such as ducts to the one surface where the inlet and the outlet are provided, and it has been easy to ensure sealing performance. On the other hand, since the inlet and the outlet are arranged in the same surface, it has been difficult to increase the flow rate of air.

In view of this, in order to increase the flow rate of air, a filter unit in which the air inlet and the air outlet are provided in different surfaces is conceivable. In this case, other constituent members need to be joined to at least two surfaces, thus making it necessary to ensure sealing performance on both of those two surfaces. Here, when the filter unit moves on the floor surface, it has been difficult to ensure flatness of the floor, and it has sometimes been difficult to accurately match the angle between joining surfaces and the positions of the joining surfaces of the filter unit in the height direction. It is therefore necessary to accurately guide the filter unit so as to realize an installation orientation in which a correct sealing state is achieved for the joining partners of both the inlet and the outlet.

SUMMARY OF THE INVENTION

The present invention has been made in view of the foregoing problems, and an object thereof is to provide a paint apparatus that enables forming a correct sealing state at both the inlet and the outlet regardless of the positional relationship with the inlet and the outlet.

According to the present invention, there is provided a paint apparatus comprising: a paint booth including an upper chamber in which a painting operation is performable and a lower chamber below the upper chamber; a receiving portion configured to receive air discharged from the paint booth; a filter module attachable to and detachable from the receiving portion and including: a filter portion configured to trap paint mist from air that passed through the receiving portion, a filter inlet portion configured to receive an inflow of air from the receiving portion, and a filter outlet portion configured to discharge air from which the paint mist was trapped by the filter portion; and at least one rail configured to guide the filter module to an attached position at which the filter module is attached to the receiving portion, wherein the filter module further includes: at least one floor travel wheel configured to travel on a floor surface lower than a surface on which the paint booth is disposed; and at least one rail travel wheel configured to travel on the at least one rail.

Further features and advantages of the present invention will become clearer from the following description of exemplary and non-limiting embodiments given with reference to the drawings.

BRIEF DESCRIPTION OF THE DRAWINGS

The terms Fig., Figs., Figure, and Figures can be used interchangeably in the specification to refer to the corresponding figures in the drawings.

DESCRIPTION OF THE INVENTION

Embodiments of a filter unit and a paint apparatus according to the present invention will be described below with reference to the drawings. Hereinafter, examples are described in which the filter unit and the paint apparatus according to the present invention are applied to a paint apparatus 100 that includes a paint booth 10 and a filter unit 1 for connection to the paint booth 10.

First Embodiment

Configurations of Paint Apparatus and Paint Booth

Figure 1:
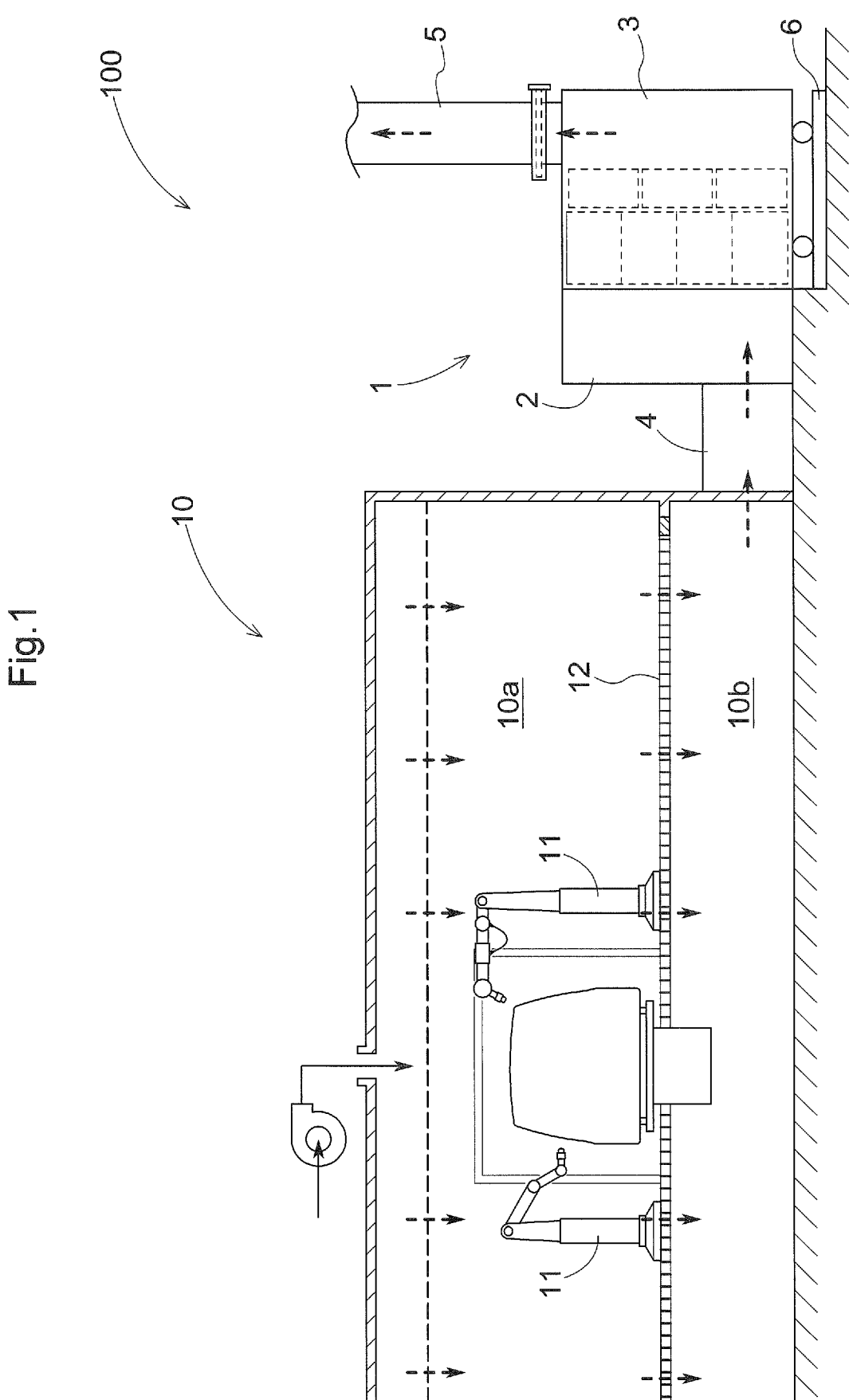
FIG. 1 is a diagram showing a paint apparatus according to a first embodiment.

The paint apparatus 100 includes the paint booth 10, the filter unit 1, an inflow duct 4, a discharge duct 5 (which is an example of a discharge portion), and rails 6. The paint booth 10 has an upper chamber 10a, which is arranged above a grating floor 12 and in which a painting operation is performed by the paint apparatus 11. The painting booth 10 also has a lower chamber 10b, which is arranged below the grating floor 12 and is connected to the filter unit 1 (FIG. 1). A downdraft flowing from above to below is formed in the paint booth 10, and air containing paint that has not adhered to the painting target is guided from the upper chamber 10a to the lower chamber 10b.

The paint booth 10 is a so-called "low floor" type of paint booth, and the height from the surface on which the paint booth 10 is disposed to the grating floor 12 is lower than in conventional paint booths. Accordingly, the height of the lower chamber 10b is lower than in conventional technology. In the present embodiment, the height of the lower chamber 10b from the floor surface is about 1200 mm. The height of the lower chamber 10b can be appropriately set in consideration of circumstances such as the installation location. It should be noted that the dimensions described for other parts are also merely examples for aiding understanding of the embodiment.

Configuration of Filter Unit

Figure 2:
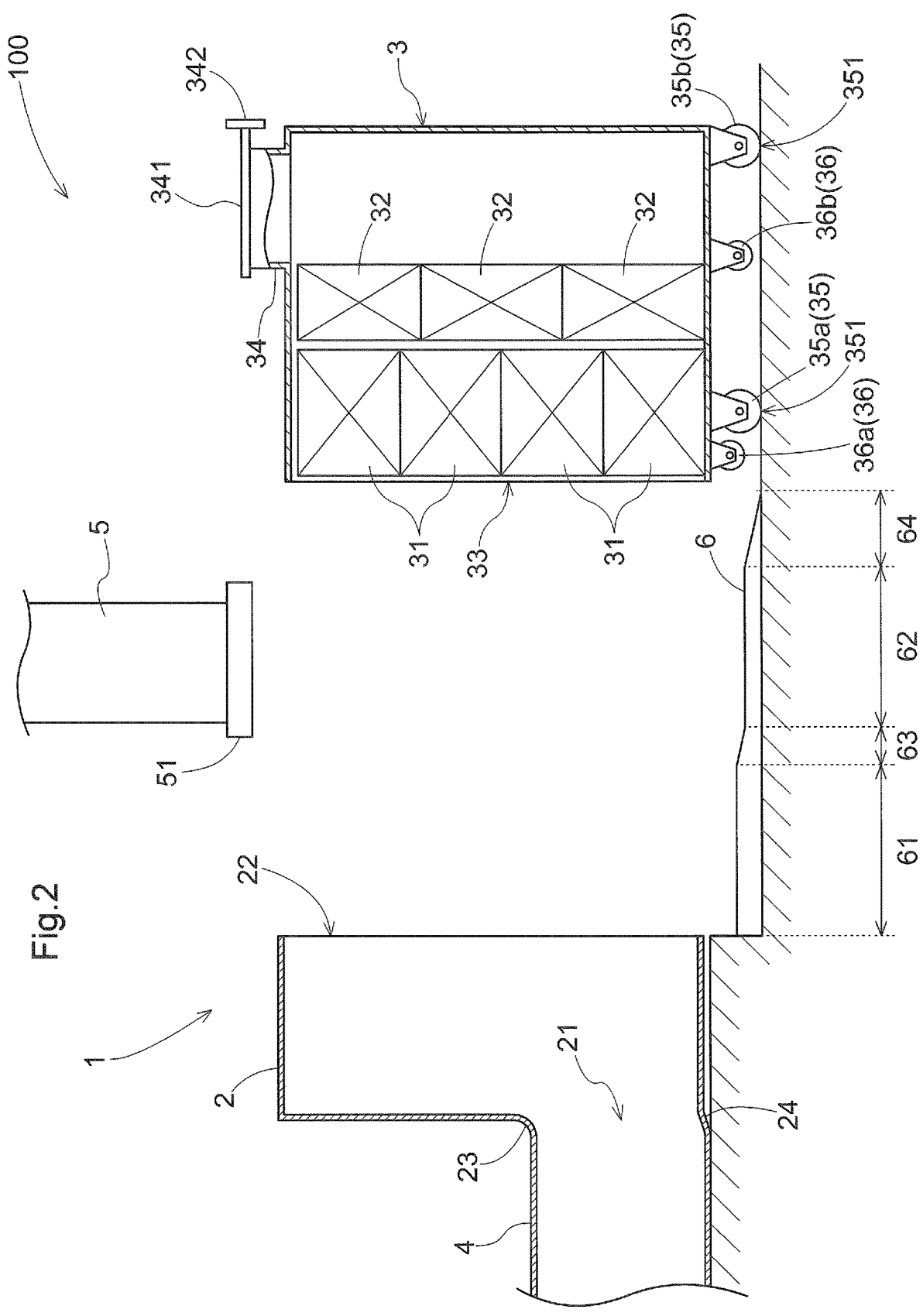
FIG. 2 is a diagram showing movement during attachment and detachment of a filter module according to the first embodiment.
Figure 3:
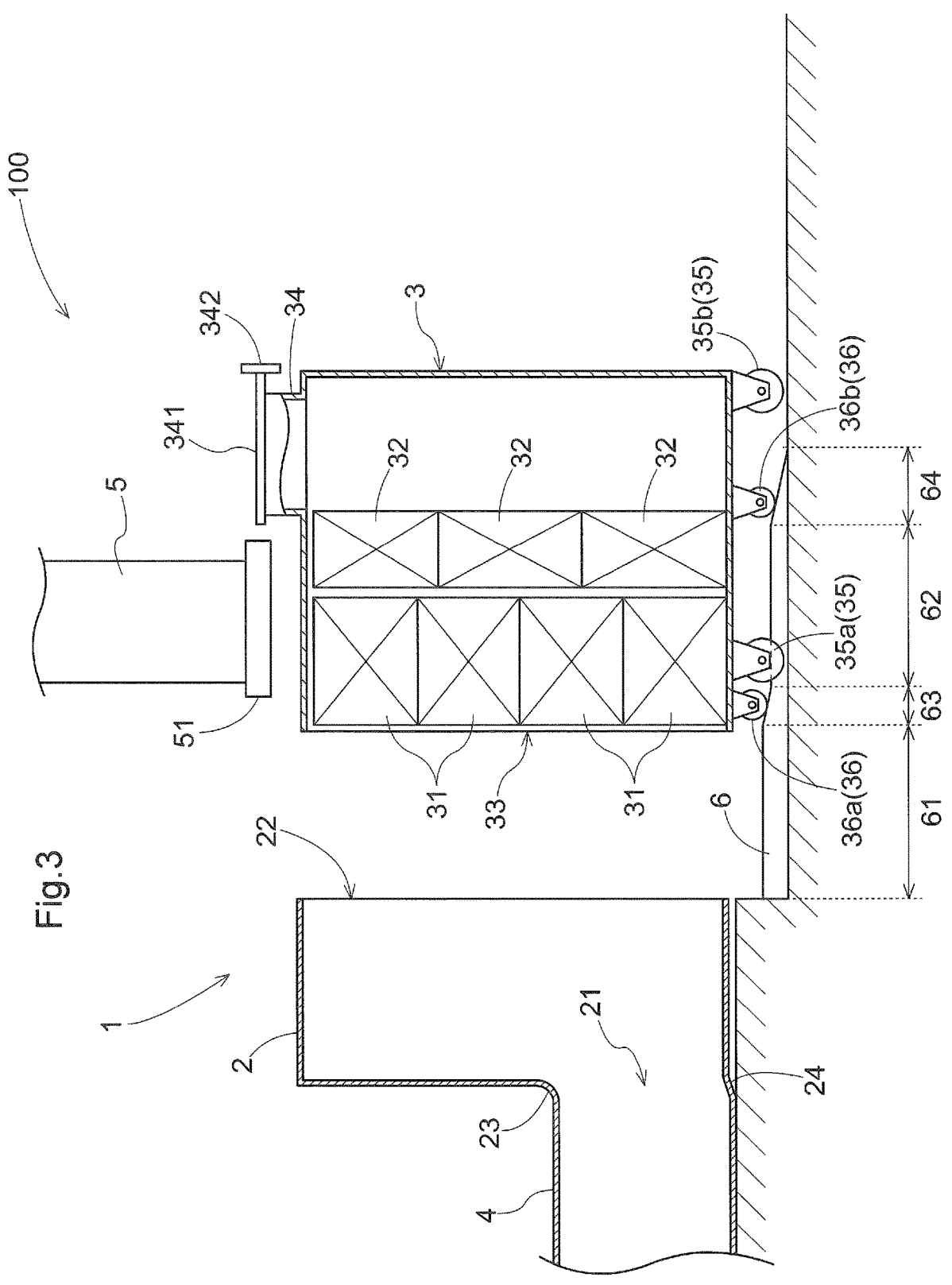
FIG. 3 is a diagram showing movement during attachment and detachment of the filter module according to the first embodiment.
Figure 4:
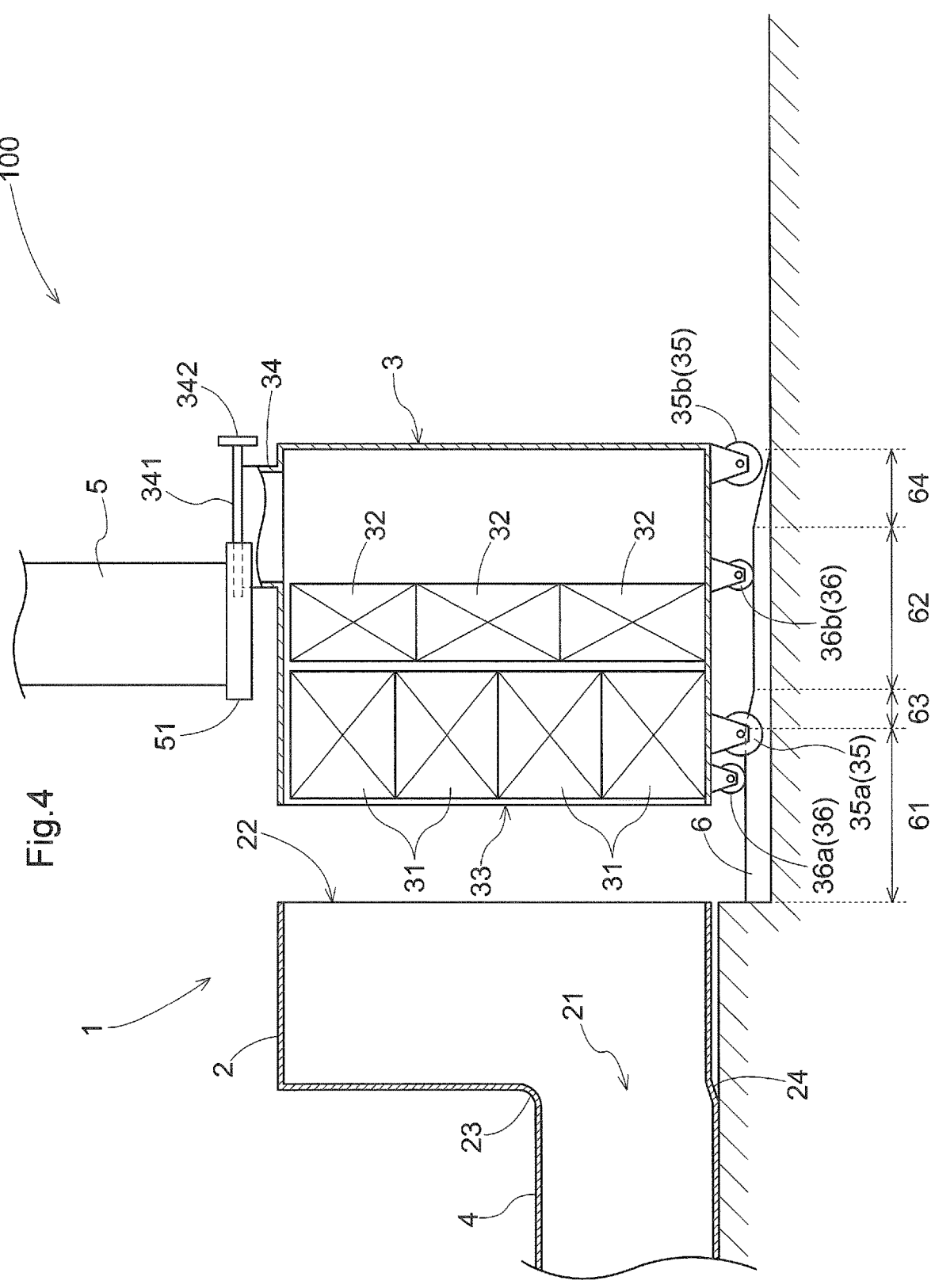
FIG. 4 is a diagram showing movement during attachment and detachment of a filter module according to the first embodiment.
Figure 5:
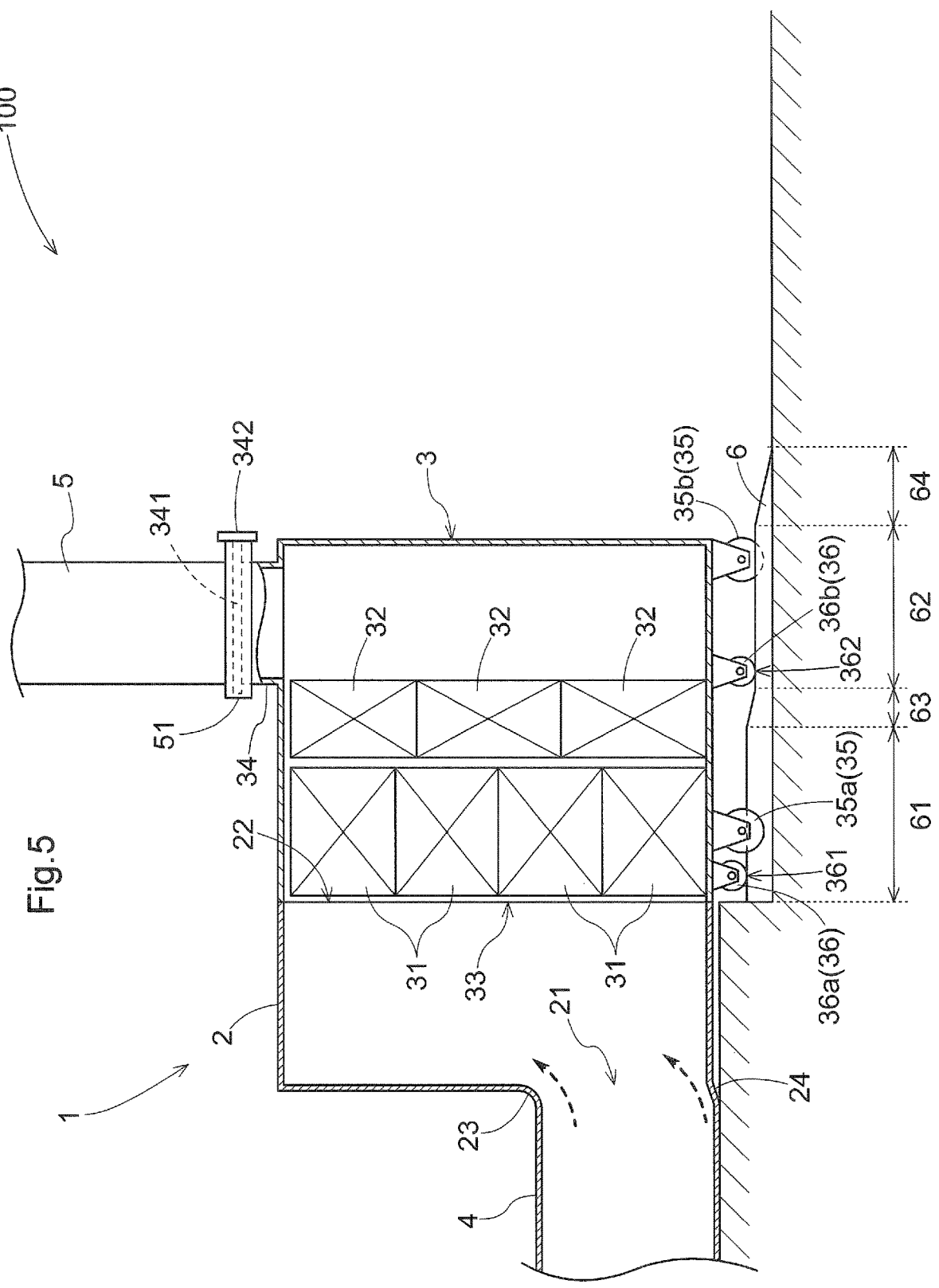
FIG. 5 is a diagram showing usage of a filter unit according to the first embodiment.

The filter unit 1 according to the present embodiment includes a front chamber 2 (which is an example of a receiving portion) and a filter module 3 (FIG. 1). FIGS. 2 to 4 show movement of the filter unit 1 when attaching and detaching the filter module 3, and FIG. 5 shows operating state of the filter unit 1 (with the filter module 3 attached).

Air discharged from the lower chamber 10b of the paint booth 10 passes through the inflow duct 4 and enters the front chamber 2, and is then guided to the filter module 3. The air is cleaned by the paint mist contained therein being adsorbed in the filter module 3, and is then discharged from the paint apparatus 100 via the discharge duct 5. As will be described later, the filter module 3 is a box-shaped member that houses a plurality of filter elements 31 and a plurality of bag filters 32.

In the present embodiment, the height of the lower chamber 10b is lower than in conventional technology. Here, if the height of the filter module 3 is made equivalent to the height of the lower chamber 10b, the number of filter elements 31 that are placed in the filter module 3 is smaller than in conventional technology, and there is concern that the filtering capacity of the filter module 3 will be insufficient. For this reason, the filter module 3 (particular the number of filter elements 31 therein) needs to be designed in accordance with the filtering capacity that is required, regardless of the height of the lower chamber 10b. In a configuration in which the filter module 3 is positioned at a height higher than the lower chamber 10b and is to be connected to the lower chamber 10b, instead of directly connecting the lower chamber 10b and the filter module 3 to each other, the front chamber 2 is provided in the filter unit 1 as a portion for adjusting the height difference between the lower chamber 10b and the filter module 3. Note that the front chamber 2 and the filter module 3 may be provided in a one-to-one relationship, or one front chamber 2 may be connected in common to a plurality of filter modules. In the latter case, the front chamber 2 extends in the vertical direction to the sheet of FIG. 1.

The front chamber 2 has a front chamber inlet 21 through which air flows into the front chamber 2 from the lower chamber 10b, and a front chamber outlet 22 through which air flows out from the front chamber 2 to the filter module 3. The front chamber inlet 21 is fixedly connected to the inflow duct 4. The front chamber outlet 22 is detachably connected to the filter module 3. The front chamber outlet 22 includes a door (not shown) for opening and closing the front chamber outlet 22.

In the present embodiment, the height of the opening of the front chamber inlet 21 is about 1000 mm in correspondence with the height of the lower chamber 10b. The height of the opening of the front chamber outlet 22 is about 2000 mm in correspondence with the height of the filter module 3. In other words, the height of the opening of the front chamber inlet 21 is lower than the height of the opening of the front chamber outlet 22.

The distance between the front chamber inlet 21 and the front chamber outlet 22 is about 800 mm, which is 40% of the height of the opening of the front chamber outlet 22. The distance between the front chamber inlet 21 and the front chamber outlet 22 is the length of the front chamber 2 in the air traveling direction. Since the front chamber 2 has a certain length in the air traveling direction, the air that flows from the front chamber inlet 21 into the front chamber 2 spreads out in the height direction before flowing out from the front chamber outlet 22 to the filter module 3. Accordingly, the air can be distributed among the filter elements 31 that are provided at a plurality of locations in the height direction. In a configuration in which the height of the opening of the front chamber outlet 22 is higher than the height of the opening of the front chamber inlet 21, it is preferable to ensure that the distance between the front chamber inlet 21 and the front chamber outlet 22 is 20% or more of the height of the opening of the front chamber outlet 22.

An upper edge 23 of the opening of the front chamber inlet 21 is rounded. A lower edge 24 of the opening of the front chamber inlet 21 is provided with an inclined surface. The rounding and provision of the inclined surface both achieve guidance for upwardly guiding the air that has flowed into the front chamber 2 from the inflow duct 4. Since the upper edge 23 and the lower edge 24 function as a guide, the air that has flowed into the front chamber 2 can easily spread out in the height direction.

The filter module 3 is a box-shaped member that houses a plurality of filter elements 31 (one example of a filter portion) and a plurality of bag filters 32 (one example of a filter portion), as shown in FIG. 5. Note that other filters may be provided between the filter elements 31 and the bag filters 32. Also, the filter module 3 has a filter inlet 33 (one example of a filter inlet portion), which is connected to the front chamber 2 and into which air enters from the front chamber 2, a filter outlet 34 (one example of a filter outlet portion), which is connected to the discharge duct 5 and discharges air from the filter module 3 to the discharge duct 5, floor travel wheels 35 for traveling on a floor surface lower than the surface on which the paint booth 10 is disposed, and rail travel wheels 36 for traveling on the rails 6.

The filter module 3 can be attached to and detached from front chamber 2. The attachment of the filter module 3 to the front chamber 2 is performed by moving the filter module 3 in a direction toward the front chamber 2. With this in mind, when forward and rearward directions are mentioned in the following description, the "forward" direction refers to the direction in which the filter module 3 approaches the front chamber 2 (the direction from right to left in FIGS. 1 to 5), and the "rearward" direction refers to the opposite direction. Also, "attached position" refers to the position of the filter module 3 when the filter module 3 has been attached to the front chamber 2 and the filter unit 1 is ready for use.

The filter elements 31 are so-called cardboard filters, and are intended for disposable use. In the present embodiment, the filter elements 31 are arranged at four levels in the height direction, on the filter inlet 33 side of the filter module 3. When the filter elements 31 are to be replaced, the filter module 3 is first removed from the front chamber 2, the used filter elements 31 are removed, and then new filter elements 31 are attached.

The bag filters 32 are filters made using olefin fiber, for example. The bag filters 32 are also replaced as needed, but are replaced less frequently than the filter elements 31.

The filter inlet 33 is a portion that functions as an inlet for air from the paint booth 10 to flow into the filter module 3 through the front chamber 2, and is provided as an opening in the front surface of the filter module 3. The filter inlet 33 is aligned with the front chamber outlet 22 of the front chamber 2 when the filter module 3 is at the attached position. In order to airtightly connect the front chamber outlet 22 of the front chamber 2 and the filter inlet 33 of the filter module 3 to each other, a packing (not shown) is mounted to the edge of the filter inlet 33.

The filter outlet 34 is a portion that functions as an outlet for the discharge of air from the filter module 3 to the discharge duct 5, and is provided as an opening in the upper surface of the filter module 3. The filter outlet 34 is aligned with the discharge duct 5 when the filter module 3 is at the attached position. The filter outlet 34 is aligned with the discharge duct 5 due to a flange 341 provided in the filter outlet 34 being accommodated in a flange accommodation portion 51 provided in the discharge duct 5. For example, the flange accommodation portion 51 is constituted by a C-channel member that extends along three sides other than a first side (the right side in FIG. 5) serving as the entrance and exit for the flange 341 (i.e., extends along a second side on the near side relative to the sheet of FIG. 5, a third side on the left side, and a fourth side on the far side relative to the sheet), and the flange 341 is accommodated in the groove portion of the C-channel member.

Figure 6:
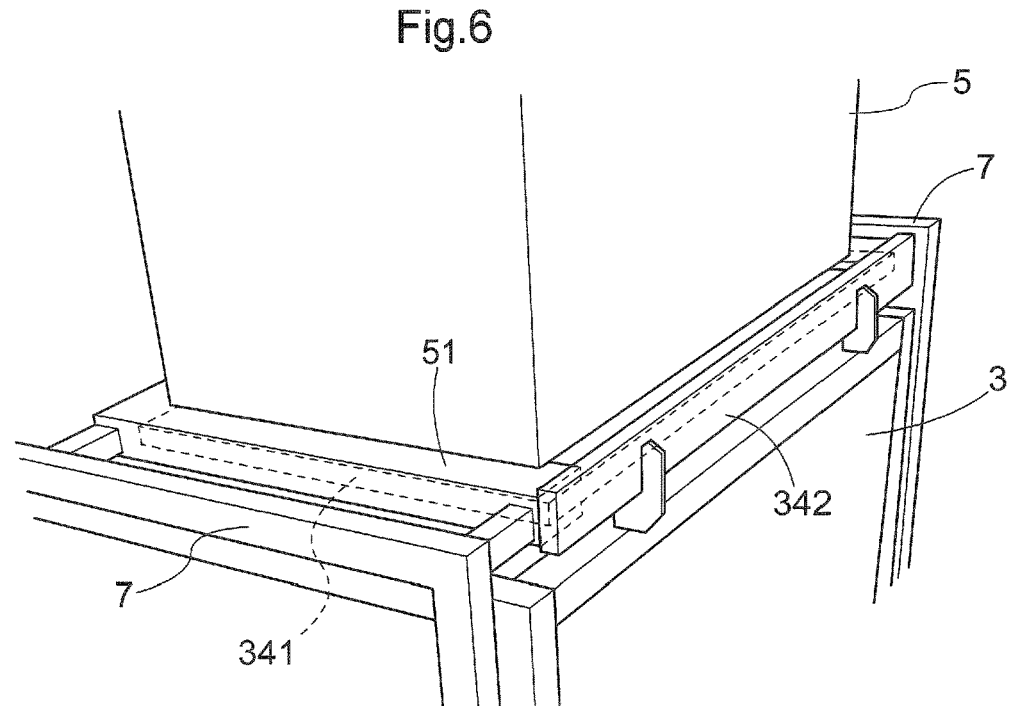
FIG. 6 is a partially enlarged view of the filter unit according to the first embodiment.

Also, a sealing member 342 (FIGS. 5 and 6) is provided to seal the first side (the right side in FIG. 5) serving as the entrance and exit for the flange 341 in the flange accommodation portion 51 while the flange 341 is accommodated therein when the filter module 3 is at the attached position. The sealing member 342 is provided so as to stand upright from the rear surface of the filter module 3. When the filter module 3 is pushed to the attached position, the sealing member 342 abuts against the entrance and exit portion of the flange accommodation portion 51. In other words, the sealing member 342 seals the connection between the filter outlet 34 and the discharge duct 5. Sealing the entrance and exit portion of the flange accommodation portion 51 with the sealing member 342 makes it possible to suppress loss of the reduced pressure state in the filter module 3.

Figure 7:
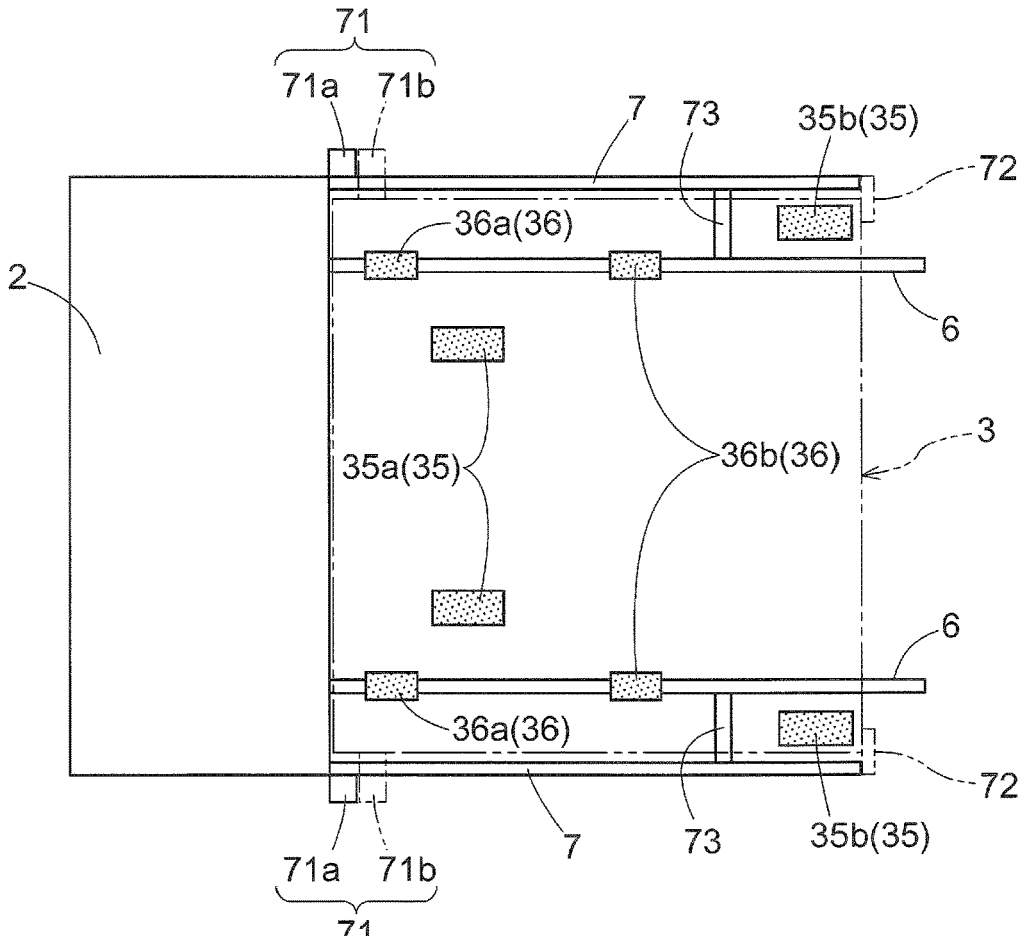
FIG. 7 is a top perspective view showing the arrangement of wheels of the filter module according to the first embodiment.

The floor travel wheels 35 are wheels for traveling on a floor surface lower than the surface on which the paint booth 10 is disposed, and include two front wheels 35a and two rear wheels 35b (FIGS. 5 and 7). The rail travel wheels 36 are wheels for traveling on the rails 6, and include two front wheels 36a and two rear wheels 36b. Rail contact portions 361, which are the lower portions of the front wheels 36a (rail travel wheels 36) that come into contact with the rails 6, and rail contact portions 362 (FIG. 5), which are the lower portions of the rear wheels 36b (rail travel wheels 36) that come into contact with the rails 6, are at higher positions than floor contact portions 351 (FIG. 2), which are the lower portions of the floor travel wheels 35, and the difference between the height of the rail contact portions 361 and 362 and the height of the floor contact portions 351 is greater than the height of the rails relative to the floor surface.

FIG. 7 shows the arrangement of the floor travel wheels 35 and the rail travel wheels 36 projected onto the horizontal plane. Among the floor travel wheels 35, the front wheels 35a are provided inward of the rails 6 when the filter module 3 is at the attached position. Among the floor travel wheels 35, the rear wheels 35b are provided at the left and right corners of the rear end of the filter module 3. Among the rail travel wheels 36, the front wheels 36a and the rear wheels 36b are spaced apart by a distance corresponding to the gauge of the two rails 6. Also, the front wheels 36a and the rear wheels 36b are biased toward the front of the filter module 3 in the forward traveling direction of the filter module 3 (the left side in FIG. 7).

The rails 6 have a base end at the front chamber outlet 22, and extend in a direction away from the front chamber outlet 22. Each of the rails 6 has a base-side portion 61 near the front chamber outlet 22 and a distal-side portion 62 distant from the front chamber outlet 22. The height of the base-side portion 61 from the floor surface is higher than the height of the distal-side portion 62 from the floor surface. Also, a first inclined portion 63 is provided between the base-side portion 61 and the distal-side portion 62. A second inclined portion 64 is provided so as to connect the end portion of the distal-side portion 62 to the floor surface. Note that the height positions of the rail contact portions of the front wheels 36a are set different from the height positions of the rail contact portions of the rear wheels 36b, in correspondence with the difference in height between the base-side portion 61 and the distal-side portion 62.

The operations of portions of the rails 6 will be described below in the order of a procedure for attachment of the filter module 3. When the filter module 3 is in the first state (FIG. 2) of being completely separated from the filter unit 1 and is then pushed toward the front chamber 2, the filter module 3 is put into a second state (FIG. 3) in which the front wheels 36a among the rail travel wheels 36 are in contact with the first inclined portions 63, and the rear wheels 36b among the rail travel wheels 36 are in contact with the second inclined portions 64. When the filter module 3 is pushed further, the front wheels 36a rolls up the first inclined portions 63 and the rear wheels 36b rolls up the second inclined portions 64, and the filter module 3 is put into a third state (FIG. 4) in which the front wheels 36a are on the base-side portions 61 and the rear wheels 36b are on the distal-side portions 62, and the flange 341 has entered the entrance of the flange accommodation portion 51. In the third state, the floor travel wheels 35 are separated from the floor surface due to the rail travel wheels 36 rolling on the rails 6. Note that the center of gravity of the filter module 3 is located on the forward side in the traveling direction, where the filter elements 31 and the bag filters 32 are mounted, and the front wheels 36a and the rear wheels 36b are arranged below the center of gravity, and thus the filter module 3 can be in a stable orientation while the front wheels 36a rolls up the inclined portion 63 and the rear wheels 36b roll up the inclined portion 64.

When the filter module 3 is pushed further, the front wheels 36a travels on the base-side portions 61 and the rear wheels 36b travel on the distal-side portions 62. Since the difference between the height of the rail contact portions 361 of the front wheels 36a and the height of the rail contact portions 362 of the rear wheels 36b is substantially equivalent to the difference between the height of the base-side portions 61 and the height of the distal-side portions 62, the filter module 3 (particularly the flange 341) can be maintained in a horizontal orientation while the filter module 3 is pushed. Accordingly, the flange 341 can be inserted into the flange accommodation portion 51 in a correct orientation.

Also, since both the left and right rail travel wheels 36 are guided by the two rails 6, the filter module 3 can be moved in a straight line toward the front chamber outlet 22 of the front chamber 2. As a result, the front chamber outlet 22 of the front chamber 2 and the filter inlet 33 of the filter module 3 can be arranged face-to-face, and fourth state (FIG. 5) in which the front chamber outlet 22 and the filter inlet 33 are airtightly connected is realized.

Note that when removing the filter module 3, the above-described procedure is performed in reverse. In other words, the filter module 3 is moved so as to realize the fourth state (FIG. 5), the third state (FIG. 4), the second state (FIG. 3), and then the first state (FIG. 2) in this order.

A frame 7 is provided as a structure that defines the attached position of the filter module 3. In the present embodiment, the frame 7 is a frame-shaped member provided surrounding the attached position of the filter module 3. Engagement pairs 71 (71*a*, 71*b*) and restricting members 72 are provided as members for fixing the relative positions of the filter module 3 and the frame 7 so as to fix the filter module 3 at the attached position.

Each of the engagement pairs 71 includes an engagement piece 71*a* attached to the frame 7 and an engagement piece 71*b* attached to the side surface of the filter module 3, and the relative positions of the filter module 3 and the frame 7 are fixed by inserting the engagement piece 71*b* into the engagement piece 71*a* to engage therewith. One engagement pair 71 is provided on each of the left and right sides of the filter module 3 and the frame 7. The engagement pairs 71 are a door catch, for example.

The restricting members 72 are combinations of a handle lock provided on the filter module 3 and a lock receiving portion attached to the frame 7. The filter module 3 at the attached position is fixed to the frame 7 by engaging the handle locks and the lock receiving portions with each other. The restricting members 72 are provided on the left and right rear end portions of the filter module 3, and on corresponding left and right sides of the frame 7.

Also, connection members 73 that connect the rails 6 to the frame 7 are provided. Due to the rails 6 being fixed to the frame 7 via the connection members 73, the rails 6 can be prevented from bending. The connection members 73 are located forward of the rear wheels 35*b* (left side in FIG. 7) when the filter module 3 has been moved to the attached position, and thus do not come into contact with the rear wheels 35*b*. Also, since the front wheels 35*a* travel inward of the two rails 6, they do not come into contact with the connection members 73 when the filter module 3 is attached to the front chamber 2.

Second Embodiment

A paint apparatus 100A according to a second embodiment includes rails 6A (FIGS. 8 and 9) instead of the rails 6 of the first embodiment. Each of the rails 6A includes a main rail 65, whose base end is at the front chamber outlet 22 of the front chamber 2 and which extends in a direction away from the front chamber outlet 22, and an extension rail 66 that can be attached to and detached from the distal-side end of the main rail 65. The main rails 65 are provided at positions corresponding to the rails 6 in the above-described embodiment, but are different from the rails 6 of the first embodiment in that the height is substantially constant over the entire length.

Figure 8:
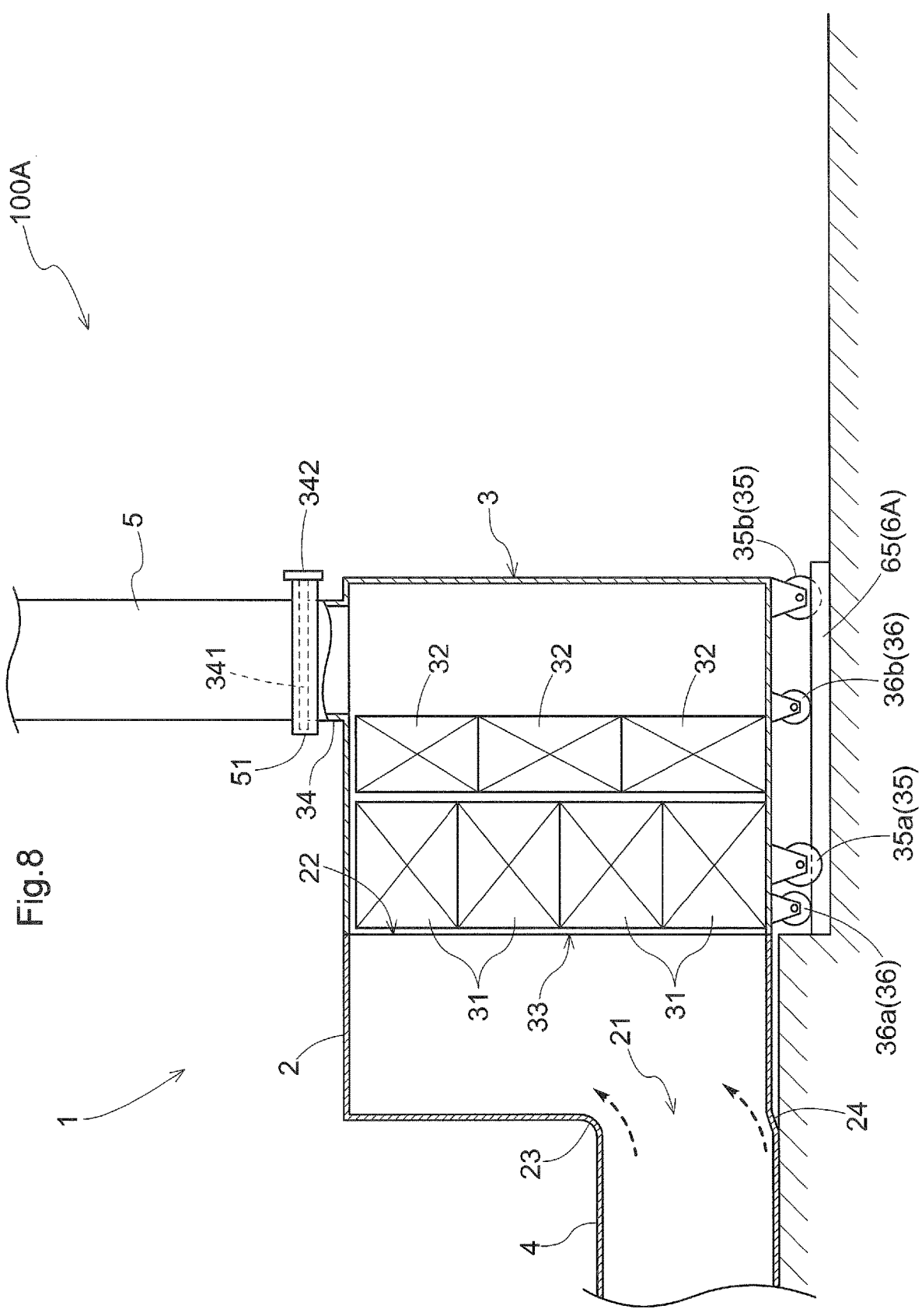
FIG. 8 is a diagram showing usage of the filter unit according to a second embodiment.
Figure 9:
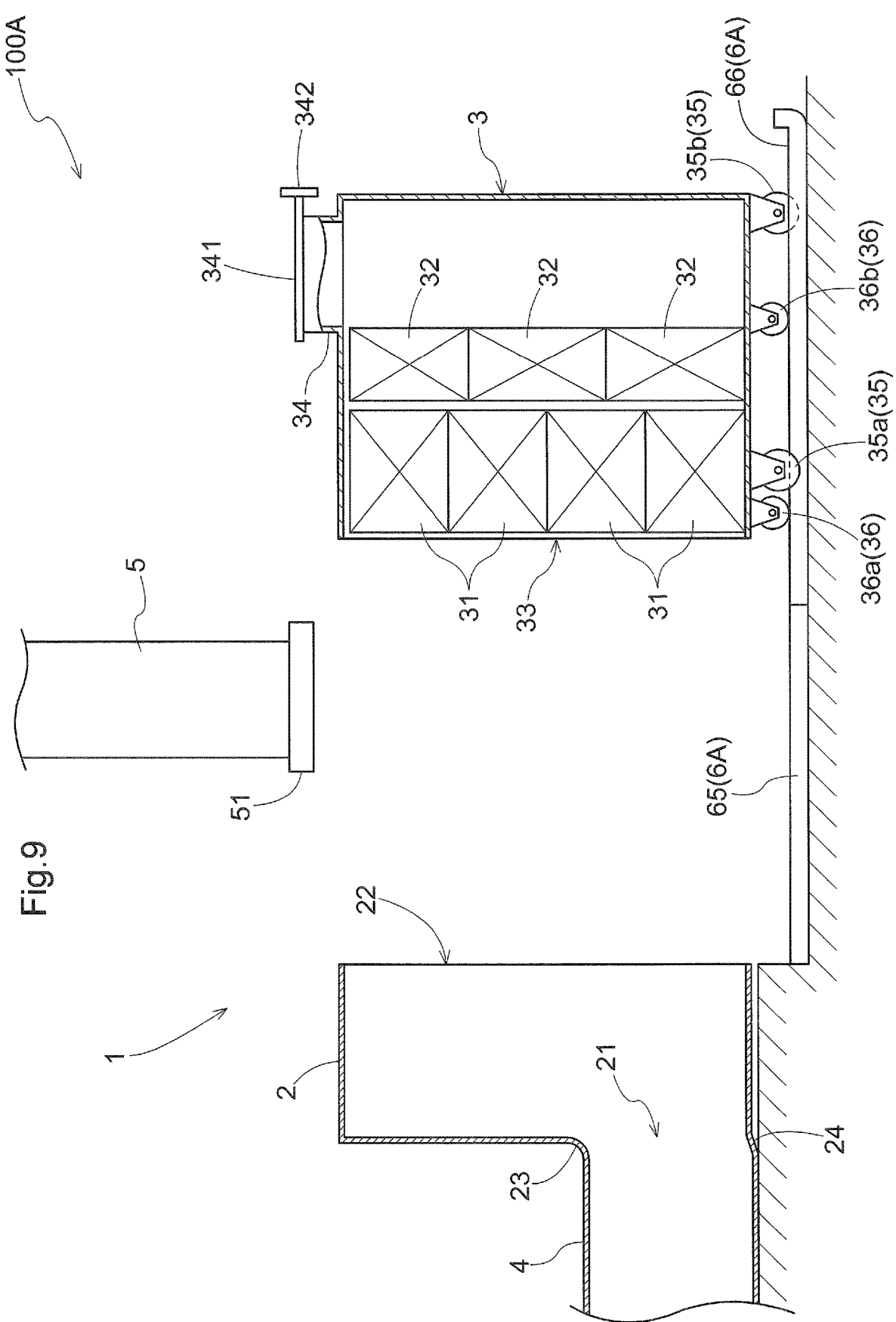
FIG. 9 is a diagram showing a state in which the filter module according to the second embodiment has been removed.

When the filter unit 1 is used with the filter module 3 fixed at the attached position, a fifth state is realized in which the filter module 3 is placed on the main rails 65 without the extension rails 66 being attached to the main rails 65 (FIG. 9). On the other hand, when the filter module 3 is to be removed from the attached position, or attached at the attached position, the extension rails 66 are attached to the main rails 65, and the filter module 3 is moved by traveling over the main rails 65 and the extension rails 66 (FIG. 8).

In the present embodiment, the extension rails 66 are provided in order to secure a sufficient distance for the filter module 3 to travel substantially horizontally at the height corresponding to the attached position, thus making it possible for the flange 341 to be inserted into the flange accommodation portion 51 in a correct orientation. Note that in the present embodiment, the lowering of the filter module 3 to the floor surface is not envisioned, and replacement and the like of the filter elements 31 is performed in a sixth state in which the filter module 3 has been pulled out to a position on the extension rails 66 (FIG. 8). A configuration is possible in which extension rails having an inclined portion (not shown) are provided instead of the extension rails 66, and the filter module 3 is lowered to the floor surface. Also, after being pulled out to the extension rails 66, the filter module 3 can remain on the extension rails 66 and be moved together with the extension rails 66 by a transportation device such as a hand lifter.

Other Embodiments

Lastly, other embodiments of the filter unit according to the present invention will be described. It should be noted that the configurations disclosed in the embodiments below can also be applied in combination with configurations disclosed in other embodiments as long as no contradiction arises.

In the above-described embodiment, the sealing member 342 is configured to stand upright from the rear surface of the filter module 3, but the sealing member 342 may be attached to the flange accommodation portion 51. In this case, through swinging or parallel translation movement or the like, the sealing member 342 can change between states of opening and closing the one side (the right side of FIG. 5) of the flange accommodation portion 51 that serves as the entrance and exit for the flange 341.

Regarding other configurations as well, it is to be understood that the embodiments disclosed in this specification are examples in all respects, and that the scope of the present invention is not intended to be limited thereby. Those skilled in the art will easily understand that modifications can be made as appropriate without departing from the scope of the present invention. Therefore, other embodiments with modifications that do not depart from the gist of the present invention are naturally included in the scope of the present invention.

What is claimed is:

1. A paint apparatus comprising:
   a paint booth comprising an upper chamber in which a painting operation is performable and a lower chamber placed below the upper chamber;
   a receiving portion configured to receive air discharged from the paint booth;
   a filter module attachable to and detachable from the receiving portion and comprising:
      a filter portion configured to trap paint mist from air that passed through the receiving portion, a filter inlet portion configured to receive an inflow of air from the receiving portion, and a filter outlet portion configured to discharge air from which the paint mist was trapped by the filter portion; and at least one rail configured to guide the filter module to an attached position at which the filter module is attached to the receiving portion, wherein the filter module further comprises:

at least one floor travel wheel configured to travel on a floor surface lower than a surface on which the paint booth is disposed; and at least one rail travel wheel configured to travel on the at least one rail.

2. The paint apparatus according to claim 1, wherein, while the filter module is at the attached position, the at least one rail travel wheel is in contact with the at least one rail, and the at least one floor travel wheel is separated from the floor surface, and wherein, while the filter module travels on the floor surface, the at least one floor travel wheel is in contact with the floor surface, and the at least one rail travel wheel is separated from the floor surface.

3. The paint apparatus according to claim 1, wherein each of the at least one rail comprises:

a base-side portion in a vicinity of the receiving portion; and a distal-side portion on a side of the base-side portion opposite to the receiving portion, and wherein a height of the distal-side portion is lower than a height of the base-side portion.

4. The paint apparatus according to claim 3, wherein the at least one rail travel wheel comprises:

a front wheel on a side corresponding to the receiving portion while the filter module is at the attached position; and a rear wheel more distant from the receiving portion than the front wheel, and wherein a lower portion of the rear wheel is located lower than a lower portion of the front wheel.

5. The paint apparatus according to claim 4, wherein a height difference between a height of the lower portion of the front wheel and a height of the lower portion of the rear wheel is the approximately same as a height difference between a height of the base-side portion and a height of the distal-side portion.

6. The paint apparatus according to claim 3, wherein each of the at least one rail further comprises:

a first inclined portion connecting a first end of the base-side portion to a first end of the distal-side portion; and a second inclined portion connecting a second end of the distal-side portion to the floor surface.

7. The paint apparatus according to claim 6, wherein the at least one rail travel wheel comprises:

a front wheel on a side corresponding to the receiving portion while the filter module is at the attached position; and a rear wheel more distant from the receiving portion than the front wheel, and wherein the rear wheel is in contact with the second inclined portion while the front wheel is in contact with the first inclined portion.

8. The paint apparatus according to claim 1, wherein;

the at least one rail comprises a pair of rails having base ends on a side corresponding to the receiving portion and extending parallel with each other, the at least one rail travel wheel comprises at least two rail travel wheels, and the at least one floor travel wheel comprises:

front wheels inward of the pair of rails and on a side corresponding to the receiving portion while the at least two rail travel wheels travel on the pair of rails; and rear wheels outward of the pair of rails and more distant from the receiving portion than the front wheel while the at least two rail travel wheels travel on the pair of rails.

9. The paint apparatus according to claim 1, further comprising:

a discharge portion configured to receive the air discharged from the filter outlet portion and guide the received air outside the paint apparatus, and wherein the filter outlet portion and the discharge portion are aligned with each other while the filter module is at the attached position.

10. The paint apparatus according to claim 9, wherein:

the filter outlet portion comprises a flange, the discharge portion comprises a flange accommodation portion configured to accommodate the flange, and the flange and the flange accommodation portion are aligned with each other while the filter module is at the attached position.

11. The paint apparatus according to claim 9, further comprising:

a sealing member configured to seal a connection between the filter outlet portion and the discharge portion that are aligned with each other while the filter module is at the attached position.

12. The paint apparatus according to claim 1, wherein each of the at least one rail comprises:

a main rail extending from the receiving portion on a base side; and an extension rail attachable to and detachable from the main rail and having a height substantially equivalent to a height of the main rail.

13. A filter module attachable to and detachable from a receiving portion of a paint apparatus, the paint apparatus comprising:

a paint booth having an upper chamber in which a painting operation is performable and a lower chamber placed below the upper chamber, the receiving portion configured to receive air discharged from the paint booth, and at least one rail configured to guide the filter module to an attached position at which the filter module is attached to the receiving portion, the filter module comprising:

a filter portion configured to trap paint mist from air that passed through the receiving portion;

a filter inlet portion configured to receive an inflow of air from the receiving portion;

a filter outlet portion configured to discharge air from which the paint mist was trapped by the filter portion;

at least one floor travel wheel configured to travel on a floor surface lower than a surface on which the paint booth is disposed; and at least one rail travel wheel configured to travel on the at least one rail.

14. The filter module according to claim 13, wherein, while the filter module is at the attached position, the at least one rail travel wheel is in contact with the at least one rail, and the at least one floor travel wheel is separated from the floor surface, and wherein, while the filter module travels on the floor surface, the at least one floor travel wheel is in contact with the floor surface, and the at least one rail travel wheel is separated from the floor surface.

15. The filter module according to claim 13, wherein each of the at least one rail comprises:
   a base-side portion in a vicinity of the receiving portion; and
   a distal-side portion on a side of the base-side portion opposite to the receiving portion, wherein a height of the distal-side portion is lower than a height of the base-side portion.

16. The filter module according to claim 15, wherein the at least one rail travel wheel comprises:
   a front wheel on a side corresponding to the receiving portion while the filter module is at the attached position; and
   a rear wheel more distant from the receiving portion than the front wheel, and
   wherein a lower portion of the rear wheel is located lower than a lower portion of the front wheel.

17. The filter module according to claim 16, wherein a height difference between a height of the lower portion of the front wheel and a height of the lower portion of the rear wheel is the approximately same as a height difference between a height of the base-side portion and a height of the distal-side portion.

18. The filter module according to claim 17, wherein each of the at least one rail comprises:

a first inclined portion connecting a first end of the base-side portion to a first end of the distal-side portion; and
   a second inclined portion connecting a second end of the distal-side portion to the floor surface.

19. The filter module according to claim 18, wherein the at least one rail travel wheel comprises:
   a front wheel on a side corresponding to the receiving portion while the filter module is at the attached position; and
   a rear wheel more distant from the receiving portion than the front wheel, and
   wherein the rear wheel is in contact with the second inclined portion while the front wheel is in contact with the first inclined portion.

20. The filter module according to claim 13, wherein:
   the at least one rail comprises a pair of rails having base ends on a side corresponding to the receiving portion and extending parallel with each other,
   the at least one rail travel wheel comprises at least two rail travel wheels, and
   the at least one floor travel wheel comprises:
      front wheels inward of the pair of rails and on a side corresponding to the receiving portion while the at least two rail travel wheels travel on the pair of rails; and
      rear wheels outward of the pair of rails and more distant from the receiving portion than the front wheel while the at least two rail travel wheels travel on the pair of rails.

* * * * *